US008393834B2

(12) United States Patent
Brugman

(10) Patent No.: US 8,393,834 B2
(45) Date of Patent: Mar. 12, 2013

(54) MACHINING APPARATUS AND METHOD FOR MACHINING A LAMINATE

(75) Inventor: Willem Brugman, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 1224 days.

(21) Appl. No.: 12/134,180

(22) Filed: Jun. 5, 2008

(65) Prior Publication Data

US 2009/0010726 A1 Jan. 8, 2009

Related U.S. Application Data

(60) Provisional application No. 60/942,014, filed on Jun. 5, 2007.

(51) Int. Cl.
*B23C 1/20* (2006.01)
(52) U.S. Cl. ......... 409/178; 408/75; 408/76; 144/144.1; 144/144.52
(58) Field of Classification Search ............. 408/75, 408/76, 175, 178, 179; 144/134.1, 135.2, 144/144.1, 144.52, 145.1, 145.2; 409/132, 409/175, 178, 179
See application file for complete search history.

(56) References Cited

U.S. PATENT DOCUMENTS 2,109,976 A * 3/1938 Pierce, Jr. .................. 33/644
4,599,018 A * 7/1986 Woods ..................... 409/178
6,129,489 A * 10/2000 Linderholm ............... 409/178
6,382,889 B1 * 5/2002 Brown et al. .............. 409/175
7,216,408 B2 * 5/2007 Boyl-Davis et al. ......... 29/33 R
2004/0265081 A1 * 12/2004 Buttrick, Jr. ................ 408/76
2005/0147477 A1 * 7/2005 Clark ........................ 408/76
2007/0036618 A1 * 2/2007 Fritsche et al. .............. 408/56

FOREIGN PATENT DOCUMENTS

| JP | 54128078 A | * 10/1979 |
| WO | WO 97/29953 A1 | 8/1997 |
| WO | WO 01/27702 A1 | 4/2001 |

OTHER PUBLICATIONS

Abstract Translation—Yasui et al (1979). JP 54128078 A.*
German Office Action, German Application No. 10 2007 026 100.6-14, Mar. 4, 2008, 8 pages.

* cited by examiner

*Primary Examiner* — Daniel Howell
*Assistant Examiner* — Michael Vitale
(74) *Attorney, Agent, or Firm* — Fenwick & West LLP

(57) ABSTRACT

A machining method for machining a superficial portion of a laminate using machine tool having a depth limiter which restricts a maximum depth of the machine tool. A guide frame having an inner guide contour restricts a maximum dimension of the superficial portion, and is secured over the superficial portion. The superficial portion is machined while the machine tool is guided by the guide contour. From another point of view, a machining apparatus for machining a superficial portion of a material is provided. The machining apparatus comprises a guide frame, an inner guide contour for guiding a machine tool, an attachment member for securing the guide frame to an attachment member, adjacent to the superficial portion, of the material.

6 Claims, 6 Drawing Sheets

MACHINING APPARATUS AND METHOD FOR MACHINING A LAMINATE

CROSS REFERENCE TO RELATED APPLICATION

This application claims the benefit under 35 U.S.C. §119 (e) of U.S. Provisional application No. 60/942,014, filed Jun. 5, 2007, which is incorporated by reference herein.

FIELD OF INVENTION

The present invention relates to a method and apparatus for machining a laminate, and in particular a fiber-metal laminate.

BACKGROUND OF THE INVENTION

Although applicable to any laminates, the present invention and the problem on which this invention is based will be described in detail with respect to fiber glass-aluminum laminates in aircraft construction.

Aluminum which is traditionally used as a standard material in aircraft construction is increasingly being replaced by novel materials, such as fiber-reinforced plastics materials or fiber-metal laminates, in which layers of fiber-reinforced plastics materials and metals are joined to form a laminate.

For example, large areas of the outer shell of the commercial aircraft Airbus A380 are produced from a fiber-metal laminate known under the name of GLARE (glass-fiber reinforced aluminum). This material consists of alternating layers, in each case only a few tenths of a millimeter thick, of aluminum and a glass fiber-reinforced epoxy resin plastics material which are bonded together under pressure during production. Important advantages of such laminates over aluminum are, for example favorable burn through and impact behavior as well as increased tear strength.

During regular flight operation of an aircraft, during loading and unloading, maneuvering on the ground, during lightning strike, maintenance and in other situations, the outer shell frequently suffers relatively slight damage, for example scratches. To be able to remedy damage of this type quickly and reliably, various standardized repair methods are used on conventional aircraft outer shells made of aluminum.

For example, according to one such repair method, scratches in the outer shell are ground out and polished with hand-held tools driven by compressed air. Another repair method comprises drilling or rubbing holes to seat repair bushes.

If repair methods of this type are applied analogously to the case of damage to outer shells consisting of a laminate, for example outer shells made from GLARE, the problem arises when a scratch is ground out for example, that the top layer of the laminate which, in the case of GLARE consists of aluminum, is penetrated and the underlying fiber layer is damaged, which impairs the stability of the fiber layer.

When holes are drilled and rubbed using hand-held tools, the precision required for seating the repair bushes is not achieved, because the fibers in penetrated fiber layers of the laminate exert a laterally deflecting force on the tool. An alternative method of guiding the repair bushes through a structure located behind the outer shell weakens this structure and is not always possible, or is only possible at great expense.

SUMMARY OF THE INVENTION

The present invention provides a machining method and a machining apparatus for use in conjunction with a machine tool that makes it possible to carry out repairs in particular on laminates at a low cost, with a high degree of precision and in a high quality manner.

The machining apparatus includes a guide frame, having a guide contour, that is secured over a superficial portion of a laminate to be machined. The guide frame makes it possible to guide the machine tool, such as a milling cutter, by means of the guide contour, so that even if fiber layers are penetrated, forces which arise and act laterally on the tool do not deflect the tool in a direction parallel to the superficial portion, which means that a high degree of machining precision is achieved, in particular in directions parallel to the superficial portion.

Since, for guidance, a guide frame with a guide contour is used which delimits a maximum dimension of the superficial portion, it is also possible to guide the machine tool along the entire guide contour, such that the entire circumferential edge of the machined region is machined in a high-quality manner and with a high degree of precision. The delimitation to the maximum dimension of the superficial portion also ensures that, for example when an aircraft fuselage is being repaired, the maximum size of machined or penetrated regions which is established by the manufacturer's technical specifications is not exceeded, which makes the repairs safer and more reliable.

Finally, where the machine tool has a machining depth limiter, the machined region is also precisely defined in the direction vertical to the superficial portion, thus in all three spatial directions.

According to an embodiment of the invention, the guide frame is secured to by an attachment member, adjacent to the superficial portion, of the laminate. This has the advantage that additional attachment devices, for example scaffolds are unnecessary, such that the method can be implemented rapidly with simple equipment, for example by maintenance technicians at an airport. Since the guide frame is positioned on a portion of the surface on which the superficial portion to be machined is also located, hooks, counter bearings or the like are not required for support on further surfaces which makes it possible for the method to be carried out at practically any point of an aircraft outer shell.

According to one embodiment, the guide frame is secured by a suction attachment of at least one suction cup in the attachment member. This is an advantage, as the frame can be attached without leaving behind imprints in the attachment member. Moreover, suction cups are simple and cheap to construct, do not require an energy supply and only slightly increase the weight of the guide frame. The considerable suction force of the suction cups allows the frame to be attached to a surface of any orientation, for example even on the lower side of the fuselage or on the lower side of a wing.

Furthermore, in another embodiment, the maximum machining depth is set corresponding to an overall thickness of at least one upper layer of the laminate. This makes it possible to remove the top layer or a plurality of adjacent layers including the top layer in a precise and complete manner, without damaging underlying layers.

In this respect, a step for detaching the at least one upper layer in the superficial portion is preferably also provided. In this way, the at least one upper layer is intentionally removed in a precise manner not only in superficial regions machined by the machine tool, for example along a delimiting line around the superficial portion, but in the entire superficial portion.

Furthermore, a step of replacing the detached at least one upper layer by a substitute material is preferably also provided. In this way, the original surface is re-closed, for example by a substitute material which is identical to the original top layer. Aluminum or an aluminum alloy is particularly advantageous, as this provides a resistive replacement surface.

According to one embodiment wherein the machine tool is a milling cutter, a maximum cutting depth is set according to a total thickness of the laminate. In this way, it is possible to cut through the entire laminar structure, without damaging structures which may be located underneath, for example reinforcing elements.

Furthermore, an embodiment provides after fixing the guide frame a step of adjusting the guide contour over a recess in the laminate. This makes it possible for the machine tool to be positioned precisely over the recess, for example to widen an existing hole or to mill off damaged areas around a rivet.

The adjustment step preferably comprises a plurality of partial steps. First of all, a probe tool which is shaped corresponding to the recess and can be moved inside the guide contour in a vertical direction to the superficial portion is inserted into the guide contour, i.e. is guided through the guide contour such that it does not move relative to the guide contour in directions horizontal to the superficial portion. In a further partial step, the guide contour and the probe tool are moved relative to the guide frame in at least one direction parallel to the superficial portion. Since the probe tool is shaped exactly according to the recess, it can be introduced into said recess, but cannot be moved inside the recess in a direction horizontal to the superficial portion. After a suitable searching movement, the probe tool is locked into the recess. Finally, in this state, the guide contour is fixed relative to the guide frame. Since the probe tool is held at a lower end fitting exactly in the recess and is held at an upper end in the guide contour, the guide contour is positioned exactly over the recess.

According to another embodiment of the machining apparatus according to the invention, the attachment member is configured to secure the guide frame over the superficial portion while leaving a predetermined distance to the superficial portion. This makes it possible to reliably position the guide frame over differently shaped, in particular over curved, superficial portions. Moreover, the surface of the laminate is treated as carefully as possible.

Furthermore, according to an embodiment, a first slide block is provided which slides along opposite, parallel first and second sides of the guide frame in a lockable manner. In this respect, the guide contour is configured to be displaceable with the first slide block. This makes it possible to adjust the guide contour by moving the first slide block in a parallel direction to the first and second frame sides and to fix the adjustment by locking the first slide block such that, in the adjusted state, the guide contour can be loaded by a tool.

In this arrangement, a second slide block is also preferably provided which slides in a lockable manner along the first slide block, the guide contour being configured to be displaceable with the second slide block. This makes it possible, by moving the first and second slide blocks, to adjust the guide contour in any parallel direction to the superficial portion and for the adjustment to be loaded by tools by locking the first slide block. The second slide block can be configured, for example such that it slides on the upper side or lower side of the first slide block or in grooves formed in the first slide block.

According to an embodiment, the guide contour is substantially rectangular and in particular square. This is advantageous because it thus allows a maximum possible surface to be machined without adversely affecting the reliability of the laminate. For example, a 7×7 cm surface maximally permitted by safety regulations for aircraft shells consisting of GLARE can be freed from its top layer by following a square contour.

According to an alternative embodiment, the guide contour is circular. This provides the advantage that a correspondingly cylindrically shaped milling cutter or other machine tool can be positioned exactly over a circular superficial portion to be machined, and this also allows the machine tool to be rotated about its axis for specific machining procedures.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The invention will be described in detail in the following on the basis of embodiments with reference to the accompanying figures of the drawings.

The figures are as follows.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
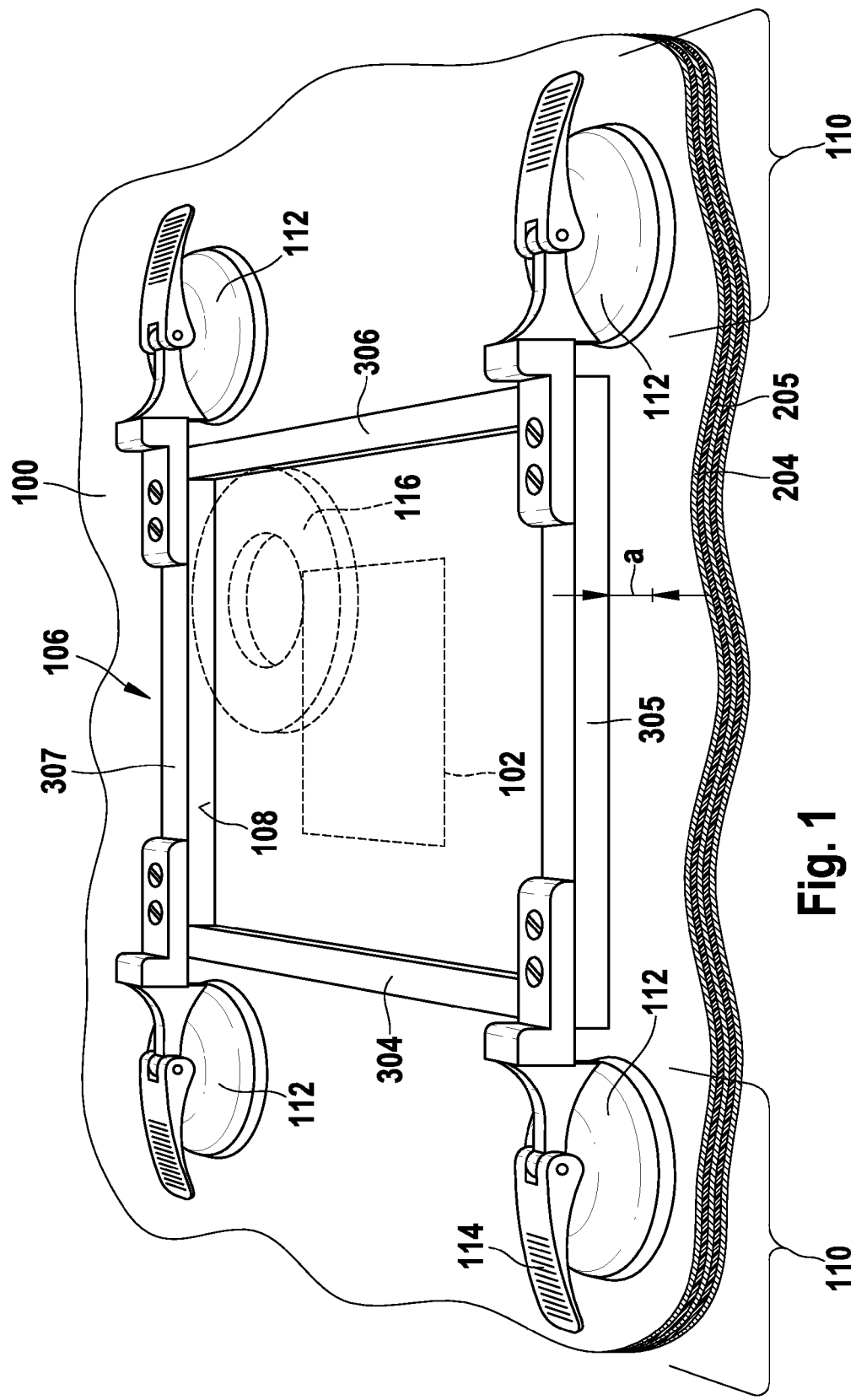
FIG. 1 is a perspective view of a machining apparatus according to a first embodiment of the invention.

FIG. 1 is a perspective view of a machining apparatus for machining a superficial portion 102 of a laminate 100. The laminate 100 is shown with an open border and can be, for example a part of an outer shell of an aircraft or spacecraft. The machining apparatus comprises a guide frame 106 with four frame sides 304, 305, 306, 307 which are joined together such that their insides have a square inner contour 108. Two opposite sides 305, 307 are each extended at both ends beyond the connection points with the two other sides 304, 306 and each support a suction cup 112 on each of their extended ends. The guide frame 106 guides a machine tool as it operates on the laminate. The machine tool can be any type of machine tool, including but not limited to a milling cutter, grinder, sander, welding gun, drill, finisher, rotary tool, shaper, planar, and the like.

Each of the suction cups 112 is fitted with a mechanical actuating lever 114 by which, when the suction cup is positioned on a surface, the suction effect can be activated and deactivated. In the illustrated drawing, all the suction cups 112 are directed in a common vertical spatial direction relative to the plane spanned by the frame 106. This makes it possible to secure the frame 106 in the illustrated manner to the surface of the laminate 100 in that the suction openings of the suction cups 112 are positioned on the surface and the suction cups 112 are activated by actuation of their levers 114. However, the suction cups 112 are appropriately configured to be rotatable with respect to the frame in one or more spatial directions to thus allow the machining apparatus to be secured to surfaces of a different shape and curvature.

When the machining apparatus is used, it is positioned over a superficial portion 102 on which the laminate 100 is to be machined such that the superficial portion is located inside the frame 106. The suction cups are firmly attached by suction in attachment members 110 of the surface which are located outside the superficial portion 102. The suction cups 112 are joined to the frame 106 such that when the suction cups 112 are firmly attached by suction to a surface, the frame 106 is positioned at a distance a parallel to the surface.

The inner contour 108 of the positioned frame 106 forms a guide contour 108 for guiding a machine tool. When the machine tool is suitably fitted with a spacer disc 116, which is shown in outline form, for guidance along the guide contour 108, the centre of the machine tool is guided on a square trajectory 102 located in the centre of the frame 106, by which trajectory the guide contour 108 fixes the boundary of the machined superficial portion 102 by means of the spacer disc 116.

FIG. 2A-E are five schematic cross-sectional views showing steps in which a five-layered laminate 100 is machined, with a thickness D and consisting of three aluminum layers 204 and two layers 205 of glass-fiber reinforced plastics material.

Figure 2A:
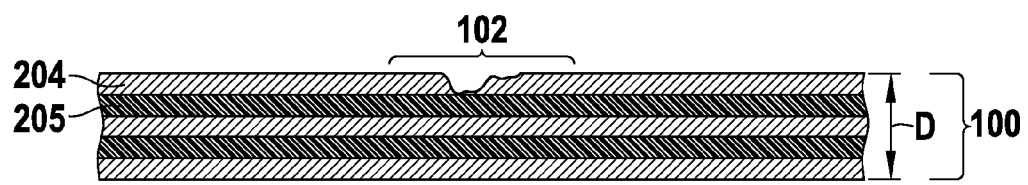
FIG. 2A-E are schematic cross-sectional views of five machining steps of a laminate according to a method of a second embodiment.

FIG. 2A shows the laminate 100 in a starting position. Before the start of the method, an upper aluminum top layer 204 was damaged, for example by impact of a stone, in a superficial portion 102 which is now to be repaired. The illustrated laminate has under the upper aluminum layer 204 a glass fiber layer 205 which was not damaged by the impact of the stone.

Figure 2B:
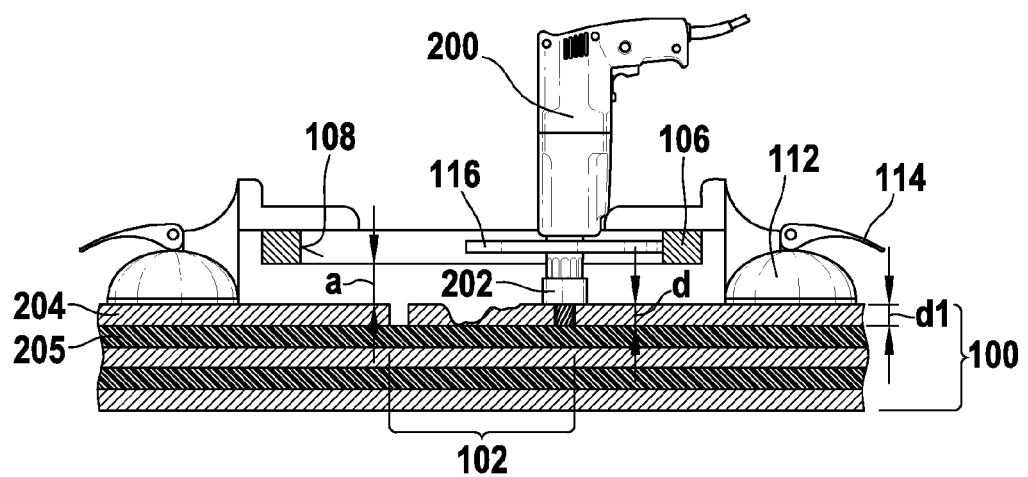

In FIG. 2B, secured to the laminate 100 is a machining apparatus 106 with a guide frame 106 and suction cups 112 such that the superficial portion 102 to be machined is located in the centre of the frame 106. The frame 106 is located at a distance from the top layer 204. A machine tool 200 is fitted with a spacer disc 116 and with a depth limiter 202 and is then simultaneously guided with the spacer disc 116 along the guide contour 108 of the frame 106 and with the depth limiter 202 along the surface of the top layer 204 around the superficial portion 102. In so doing, on the one hand the depth limiter 202 restricts the machining depth to a value d which was previously set in accordance with the thickness d1 of the damaged top layer 204. On the other hand, the guide contour 108 restricts the lateral dimensions of the machined superficial portion 102.

Figure 2C:
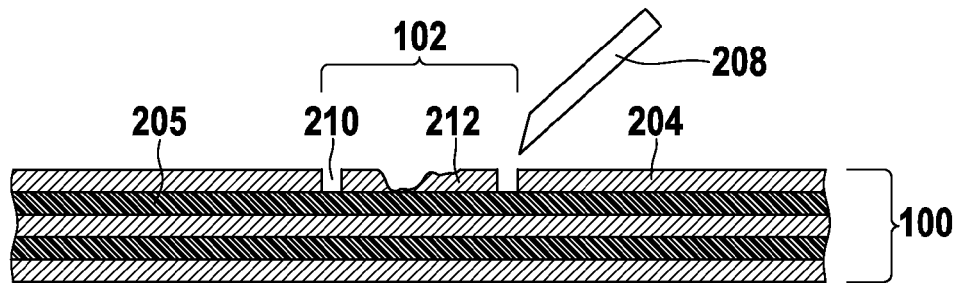

FIG. 2C shows the result of the milling procedure shown in FIG. 2B. Produced around the superficial portion 102 is a circumferential milled groove 210 which precisely cuts through the top layer 204 but does not extend into the underlying layer 205. Thus, located in the centre of the superficial portion 102 is an isolated layer 212 consisting of the material of the top layer 204 (aluminum) which still only adheres to the laminate 100 by its bond with the underlying layer 205. The bond is now detached using a plastics material wedge 208, made for example of nylon and the isolated layer is removed.

Figure 2D:
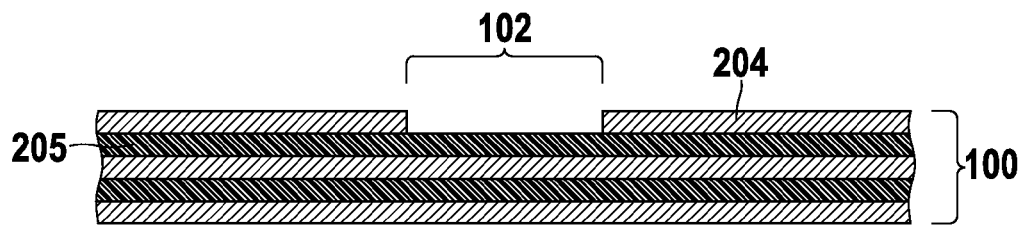

FIG. 2D shows the result of the detachment procedure shown in FIG. 2C. The top layer 204 has been precisely removed from the laminate 100 in the surface region 102, without thereby damaging the underlying layer 205.

Figure 2E:
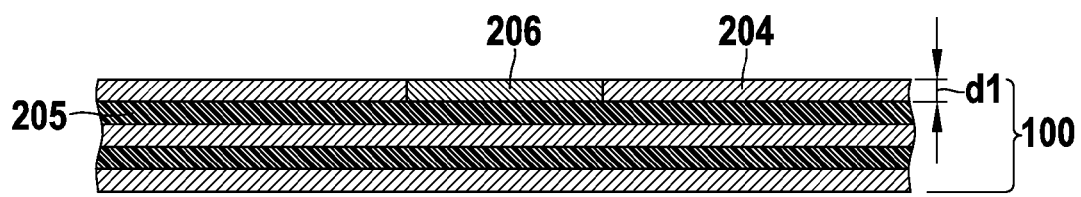

FIG. 2E shows the result of a further step in which the removed region of the top layer 204 has been filled with a substitute material 206. This substitute material 206 can be, for example aluminum and thus is identical to the material of the top layer 204. For example for this step, an aluminum sheet 206 of thickness d1 of the top layer 204 can be cut to size according to the shape of the superficial portion 206 and bonded therein. Since the illustrated method allows superficial portions 206 to be machined with ever constant dimensions, aluminum sheets 206 which are ready cut to size can be prepared in advance to save time.

Figure 3:
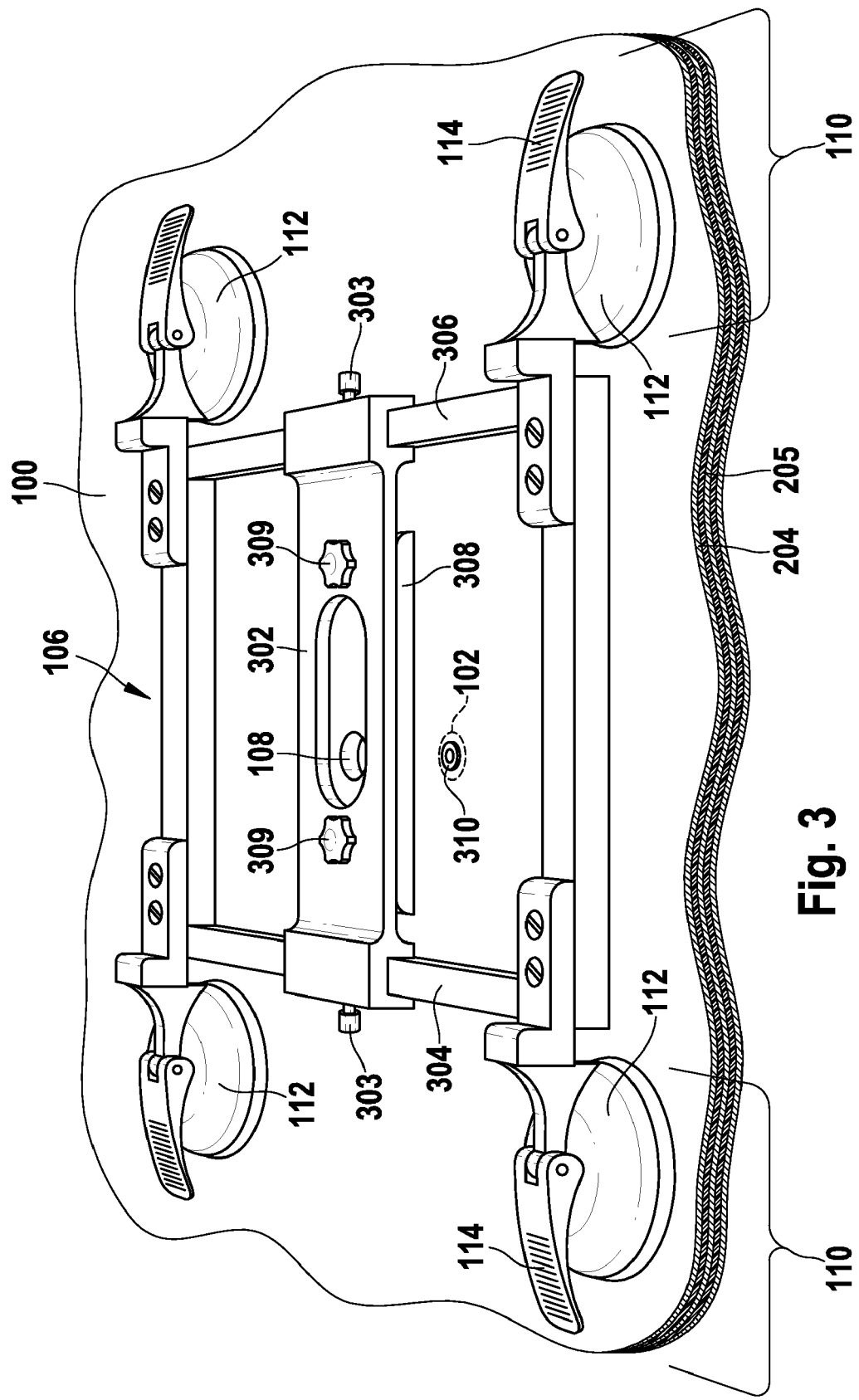
FIG. 3 is a perspective view of a machining apparatus according to a third embodiment of the invention.

FIG. 3 is a perspective view of a machining apparatus according to a third embodiment. As in the first embodiment shown in FIG. 1, the machining apparatus comprises a frame 106 which is supported by four suction cups 112 and which, when the machining apparatus is in use, is secured over a superficial portion 102 of the laminate 100 by the firm suction of the suction cups 112 in attachment members 110, located outside the frame 106, of a laminate 100.

Unlike the first embodiment, the superficial portion 102 to be machined is centered circularly around a rivet 310 and is considerably smaller than the dimensions of the frame 106. In order to be able to position a machine tool precisely over the rivet 310, the machining apparatus has a first slide block 302 and a second slide block 308 which make it possible to position precisely over the superficial portion surrounding the rivet 310 a guide contour 108 formed on the second slide block inside the frame initially positioned roughly over the portion to be machined using the suction cups 112, by a fine adjustment.

In this arrangement, the first slide block 302 is configured in the form of a bridge which joins two opposite frame sides 304, 306, can be moved along the frame sides 304, 306 and can be locked with respect to the frame sides 304, 306 by locking screws 303. The second slide block 308 is configured as a carriage which slides on the lower side of the first slide block 302 as if it were on a rail and can be locked with respect to the first slide block by locking screws 309. The guide contour 108 can thus be adjusted and locked over any point inside the frame 106 by the cooperation of the slide blocks.

Figure 4A:
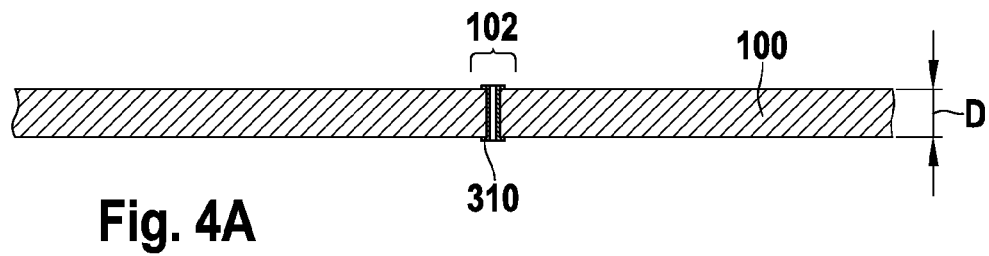
FIG. 4A-E are schematic cross-sectional views of five machining steps of a laminate according to a method of a fourth embodiment.

FIG. 4A-E are five schematic cross-sectional views of five machining steps of a laminate according to a method of a fourth embodiment. FIG. 4A shows the starting position of the laminate 100 in which, for reasons of clarity, no individual layers are shown inside the thickness D. Introduced into the laminate 100 is a rivet 310 on which milling is to be carried out in a superficial portion 102 which is precisely centered on the rivet 310.

Figure 4B:
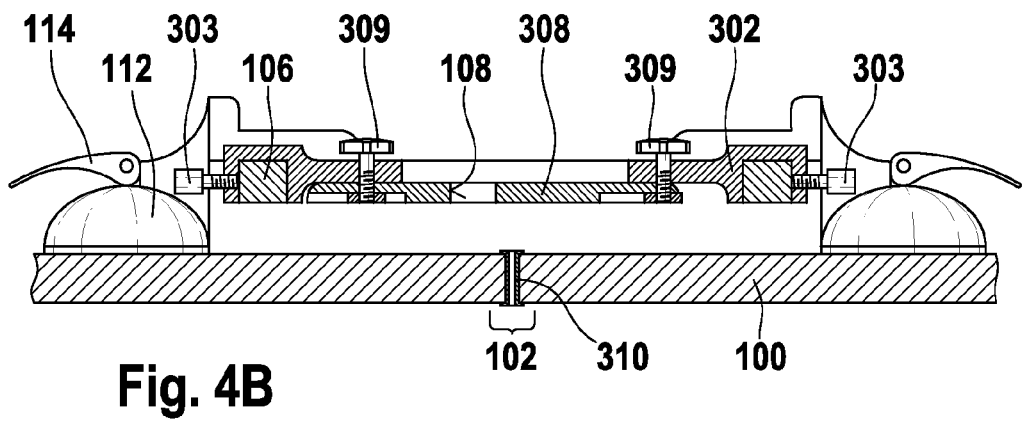

In FIG. 4B, secured to the laminate 100 is a machining apparatus 106, 112 with a guide frame 106 and suction cups 112 such that the superficial portion 102 to be machined is located inside the frame 106. The guide contour 108 which can be adjusted in two directions with the first slide block 302 displaceable on the guide frame 106 and the second slide block 308 displaceable on the first slide block is, however, not centered precisely over the rivet 310 in the centre of the superficial portion 102.

Figure 4C:
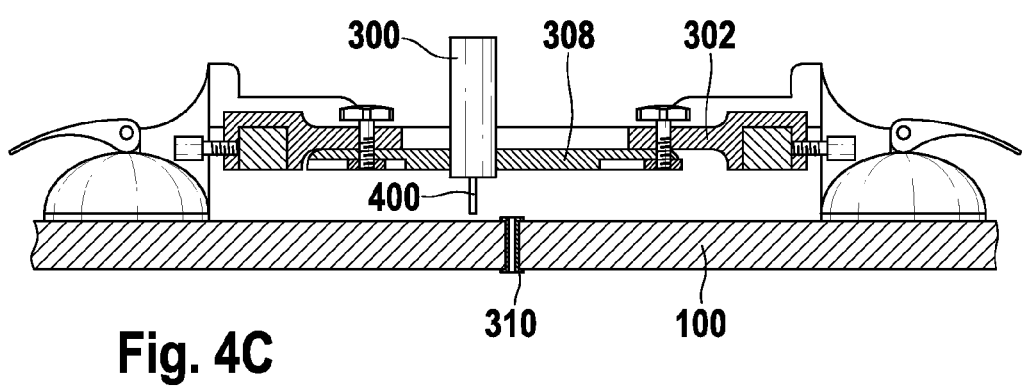

In FIG. 4C, a probe tool 300 is inserted into the second slide block 308. The diameter of the upper end of the probe tool 300 fills the guide contour 108. Configured at the lower end of the probe tool 300 is a probe rod 400 having a diameter which corresponds to an internal diameter of the rivet 310 with a looser fit. To probe the position of the rivet 310, the probe tool 300 is then guided over the surface of the laminate 100 by means of the slide blocks 302, 308.

Figure 4D:
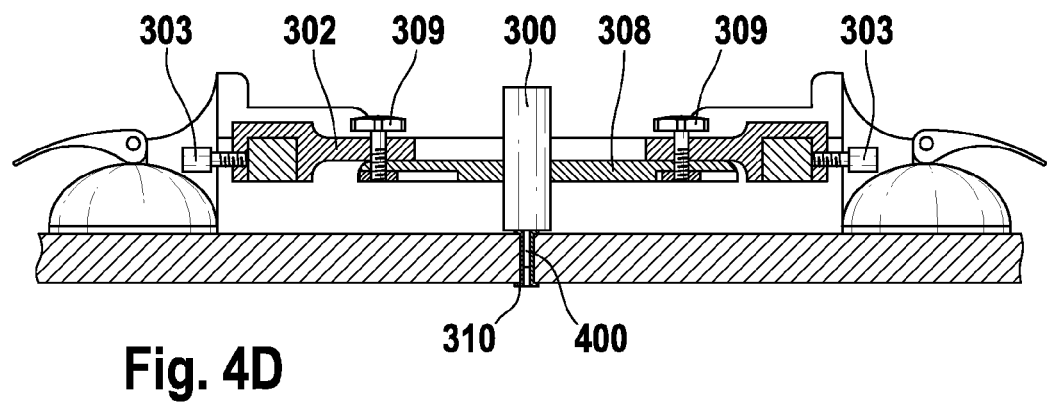

FIG. 4D shows a stage in which the position of the rivet 310 has been successfully probed such that the probe rod 400 is locked into the rivet 310. The positions of the slide blocks 303, 308 are then locked with the associated locking screws 303, 309 and the probe tool 310 is then removed.

Figure 4E:
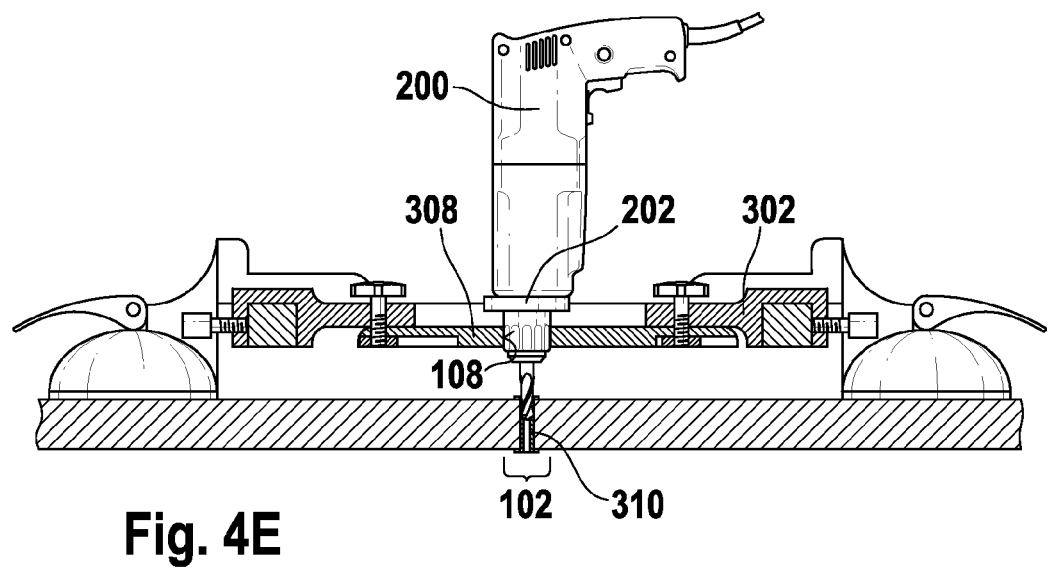

In FIG. 4E, a machine tool 200 has been introduced into the guide contour 108 instead of the removed probe tool 300. As a result of the previous adjustment, the machine tool 200 is centered precisely over the rivet 310, such that the superficial portion 102 is accurately machined. In so doing, the machining depth (e.g., cutting depth) of the machine tool is restricted by a depth limiter 202.

Although the present invention has been described here on the basis of preferred embodiments, it is not restricted thereto, but can be modified in many different ways, and it will be understood by persons skilled in the relevant art that various changes in form and details can be made therein without departing from the spirit and scope of the invention.

For example, a superficial portion to be machined can also be located on the edge of a material surface or can extend beyond said edge, in which case it is possible for the frame to be secured using only two of the suction cups. During machining, it is possible for more than one top layer to be removed and replaced by a substitute material. The machining apparatus can be used for machining other materials, such as aluminum or carbon fiber-reinforced plastics materials.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A machining apparatus for machining a superficial portion of a material, comprising:

a guide frame for arrangement over the superficial portion, having an inner guide contour for guiding a machine tool on a boundary of a maximum dimension of the superficial portion;

an attachment member to secure the guide frame to an attachment portion, adjacent to the superficial portion, of the material;

a first slide block which slides in a lockable manner along opposite, parallel first frame side and second frame side of the guide frame, the guide contour being configured to be displaceable with the first slide block; and a probe tool for locking into a recess of the superficial portion and which can be inserted into the guide contour such that relative to the guide contour, the probe tool is guided movably in a vertical direction to the superficial portion and immovably in horizontal directions to the superficial portion.

2. The machining apparatus according to claim 1, further comprising:

a second slide block which slides in a lockable manner along the first slide block, the guide contour being configured to be displaceable with the second slide block.

3. The machining apparatus according to claim 1, wherein the attachment member comprises at least one suction cup for suction attachment to the attachment portion.

4. The machining apparatus according to claim 1, wherein the attachment member is configured to secure the guide frame over the superficial portion while leaving a predetermined distance to the superficial portion.

5. The machining apparatus according to claim 1, wherein the guide contour is substantially rectangular.

6. The machining apparatus according to claim 1, wherein the guide contour is circular.

* * * * *